Dec. 22, 1953 L. K. STRAUS 2,663,497

ELAPSED TIME COMPUTER

Filed June 29, 1950 2 Sheets-Sheet 1

INVENTOR.
Lois K. Straus,
BY George H. Simmons
Atty.

Dec. 22, 1953 L. K. STRAUS 2,663,497

ELAPSED TIME COMPUTER

Filed June 29, 1950 2 Sheets-Sheet 2

INVENTOR.
Lois K. Straus,
BY George H. Simmons
Atty

Patented Dec. 22, 1953 2,663,497

UNITED STATES PATENT OFFICE 2,663,497

ELAPSED TIME COMPUTER

Lois K. Straus, Great Neck, N. Y., assignor to The Shaw-Walker Company, Muskegon, Mich., a corporation of Michigan Application June 29, 1950, Serial No. 171,032

3 Claims. (Cl. 235—61.8)

This invention relates to apparatus for computing and recording time elapsing between the beginning and ending of an operation and has for its principal object the provision of a new and improved apparatus of this kind.

It is a main object of the invention to provide computing and printing, in legible numerals, the elapsed time, automatically and simultaneously with punch-out at the end of the operation.

Another object of the invention is to provide computing and recording elapsed time automatically and without human intervention other than the inserting of a card in a device.

Another object of the invention is to provide computing elapsed time, which includes recording the time so computed by numerals which clearly give the hours and fractional hours.

Another object of the invention is to provide recording elapsed time, which includes also recording the clock times of both start and finish, in addition to recording the elapsed time, so that the accuracy of the computation of elapsed time can be checked readily should occasion arise.

Another object of the invention is to provide computing and recording elapsed time which can be manufactured at low cost without sacrificing accuracy and durability, and which apparatus can be maintained in proper working condition economically.

Further objects of the invention not specifically mentioned here will be apparent from the detailed description and claims which follow, reference being had to the accompanying drawings in which a preferred embodiment of the invention is shown by way of example and in which:

Figure 1:
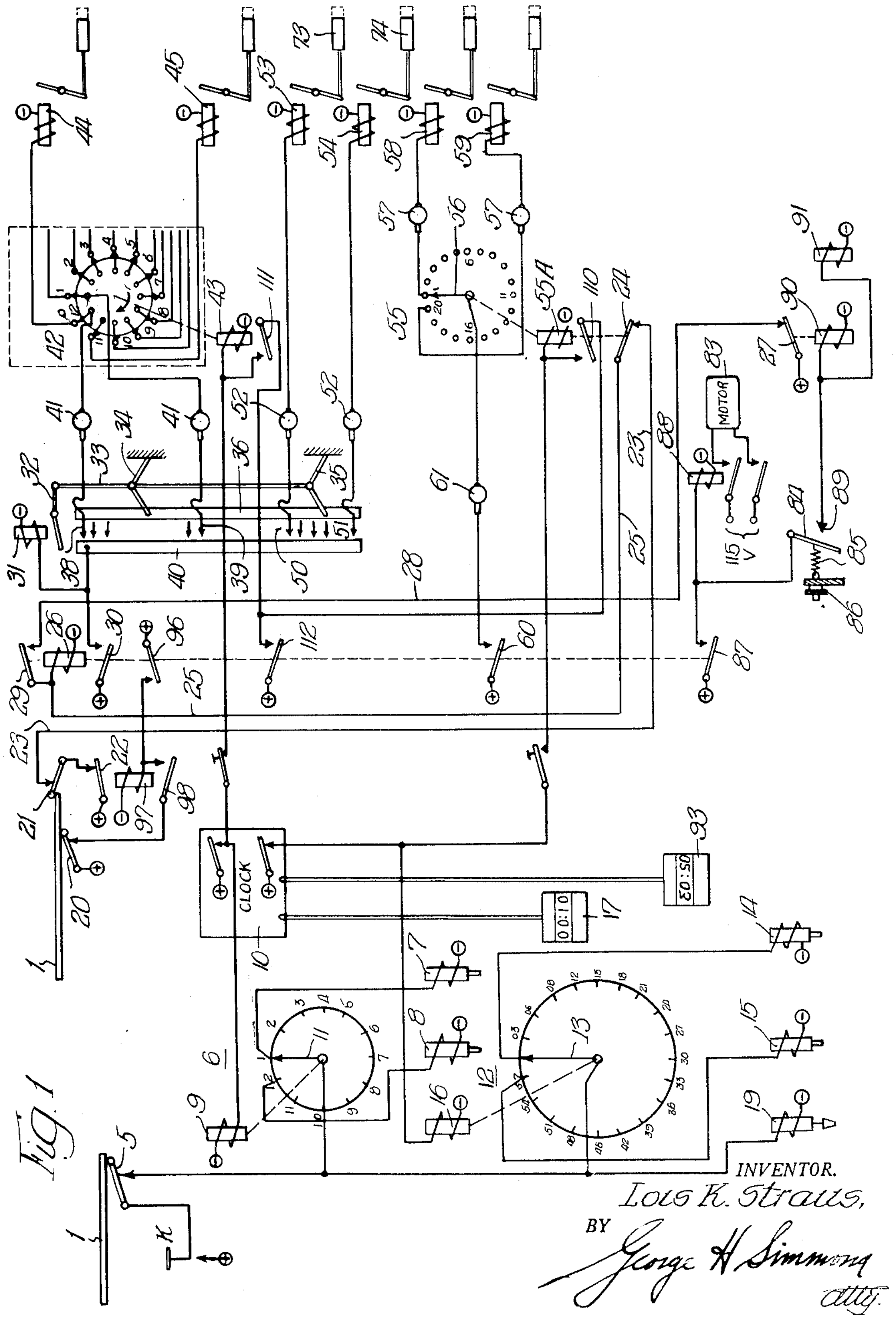
Fig. 1 is a schematic circuit diagram illustrating the invention.

In factories, garages, and the like, workmen punch a clock at the beginning and end of the work day, and in certain instances, where job costs are involved, at the beginning and end of each operation. Heretofore the cards so punched show clock times at the beginning and end of the period, and it has been necessary to compute the elapsed time manually from the visual data so recorded on the card. Manual computations of elapsed time, like any other manual operation, give rise to many errors, are time-consuming, and therefore expensive. The present invention seeks to overcome this by automatically computing and recording the elapsed time.

In certain prior art of which I am aware, devices for computing and recording elapsed time have been shown; however, such devices operate on the principal of punching a time card, both at "in" or start time, and "out" or finish time, thereby to perforate the card at locations indicative of those times. The punched card is inserted in a computing machine which translates the data recorded on the card by the perforations into elapsed time and prints that time thereon.

Such devices have not gone into general use and are objectionable in that the elapsed time is not readily available to the workman as he punches out at the end of an operation, but rather it is not until the cards are run through the computing machine in the accounting office that the elapsed time recorded on the card is made available.

The present invention provides a method wherein the elapsed time is printed in readily readable numerals, preferably Arabic, simultaneously with the printing of the clock time at punch-out on the card and the workman can immediately determine the time which he consumed in the particular operation.

In accordance with the teachings of the present invention, at the start of a job or operation the workman inserts a time card in a device which records the time of day thereon by printing it in hours and decimals of an hour. The device also punches a pair of perforations in the card, which perforations are located thereon so as to indicate the hour of start with one perforation and the fractional hour of start with the other perforation.

In most accounting systems in common use today, the maximum period of time to be recorded is twelve hours, and the minimum period of time taken into account is one-twentieth of an hour, or three minutes. Preferably the perforations punched in the card at the beginning record hours are from one to twelve, and minutes in steps of three minutes each. Obviously, however, the method is not limited to such time intervals and can be equally well applied to systems wherein 24-hour periods are encountered and where fractional hours are recorded in tenths or hundredths of an hour, as the case may be.

The method of the present invention contemplates that at the end of the job the workman will insert the time card into a computer-recording machine which moves a plurality of contactors into engagement with the card, two of which contactors register with the perforations in the card, thereby to extend circuits to electromagnetic devices. The first of these devices designates the number of whole hours elapsed between the punch-in and punch-out times. The second circuit extends through an electromagnetic device which designates the fractional hour at the beginning of the operation. Simultaneously a third circuit is extended to another electromagnetic device designating the fractional hour at the time of punch-out, whereupon the computer mechanism is set into operation to bring into printing position type faces corresponding to the elapsed time in whole hours and fractions of an hour. This positioning of the type faces is controlled jointly by the three electromagnetic devices, and upon the completion of the setting of the type the card is brought into printing engagement with the type and simultaneously into printing engagement with type wheels which are clock-controlled and which print the hour of the time of punch-out. These operations being completed, the mechanism restores to normal, and upon removing the card from it there is recorded on the card the time at which the workman punched in, the time at which the workman punched out, and the elapsed time therebetween, all recordations being in clearly readable numerals, preferably Arabic numerals. The workman can therefore, at the time of punch-out, check the time which he has spent on that particular operation.

Figure 4:
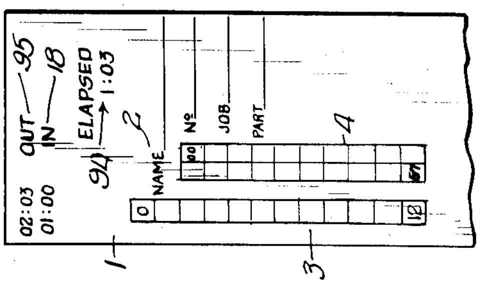
Fig. 4 is a face view of the card used in the invention.

Referring now to the drawings, particularly Figs. 1 and 4, the time card 1, used in the present invention, contains the name and number of the employee, as indicated at 2, the job and part numbers, and such other legends as may be required in the accounting system in which it is to be used. The card also contains a group of spaces 3, twelve in number, which represent twelve whole hours, it being assumed that the system in which the card is to be used covers a maximum elapsed time of twelve hours. The twelve spaces are numbered consecutively from 1 to 12.

The card also contains a second group of spaces 4 consisting of twenty spaces arranged in two rows of ten each and numbered consecutively from 00 to 57 in steps of 3, it being further assumed that the accounting system recognizes one-twentieth of an hour, or three minutes, as the minimum time employed.

When the workman is about to begin a particular job or a day's work, as the case may be, he inserts the card 1 into the punch-in section of a recording device, or a punch-in device which is separate and distinct from the recording device. When the card is completely inserted in the device, it makes contact with a limits type switch 5 which may conveniently be a so-called micro-switch, characterized in that it is capable of closing its contacts by a movement of its operating lever no greater than the thickness of an ordinary time-clock card.

Within the punching device is a switch mechanism indicated generally at 6 and shown to comprise a single wiper 11 adapted to move consecutively over twelve bank contacts numbered 1 to 12. Connected to each of these contacts is an electromagnetic punch of which the number 1 punch 7 and the number 12 punch 8 are shown. The motor magnet 9 of the switch is operated by the clock 10 over the obvious circuit which is closed once an hour for a brief interval, say a second, which terminates exactly on the hour. The magnet operates a mechanism which advances the wiper 11 of the switch one step when the magnet deenergizes. Such stepping switches are readily available on the open market.

In the punch-in mechanism is a second stepping switch, indicated generally at 12, consisting of a single wiper 13 which engages one of the contacts in a bank of twenty contacts numbered consecutively from 00 to 57 in steps of three. Connected to these contacts are twenty electrical punches of which punch 14 representing 00, and punch 15 representing 57, are shown. The magnet 16 is operated from the clock 10 over the obvious circuit which is closed at 3-minute intervals for a small period of time, say one second, which terminates exactly at the 3-minute interval. The magnet 16 advances the wiper 13 one step each time it deenergizes.

With the card 1 inserted in the device, and the wipers 11 and 13 in the position shown, when the manual key K is closed a circuit may be traced from positive through key K, through microswitch contact 5, wiper 11, and the magnet 7, with a parallel branch through wiper 13 and magnet 14 operating magnets 7 and 14 to punch two perforations in the card thereby to record 1:00 o'clock, as indicated in Fig. 4. The clock mechanism 10 also controls a time-of-day printer 17 which prints the "in" or start time on the card, as indicated at 18 in Fig. 4, and the above circuit is extended through printing magnet 19 to operate that magnet and record the time of start on the card.

When the workman finishes the operation, or the day's work, as the case may be, he inserts card 1 into the computer-recording device. Upon insertion in the device, time card 1 first engages a limits type switch 20 which may conveniently be a so-called micro-switch operable to close its contacts upon relatively small movement of its operating lever, the switch 20 closing without particular effect at the moment. When the card is completely inserted into the device, it engages a second limits type switch 21 which closes a circuit which may be traced from positive through spring 22 and its break contact, through the make contact of switch 21, conductor 23, through spring 24 and its break contact, conductor 25, through the winding of relay 26 to negative, operating relay 26. A holding circuit for this relay may now be traced from positive through spring 27 and its break contact, conductor 28, spring 29 and its make contact, through the winding of the relay to negative.

Relay 26, upon operating, closes a circuit from positive through spring 30 and its make contact, through the winding of magnet 31 to negative, operating that magnet. The armature 32 of magnet 31 is connected by a suitable rod 33 with toggle links 34 and 35 that support an insulating bar 36 upon the framework of the device. Carried by the bar 36 are two groups of contacts, the first group containing twelve contacts of which two, 38 and 39, are shown.

Assuming that contactor 38 registers with the space number 1 in the group 3 on the card 1, and contactor 39 registers with the space 12 in that group, since space 1 is perforated, contactor 38 will project through the card 1 and engage the plate 40.

The twelve contactors in the group of which 38 and 39 are a part are connected through suitable slip rings 41 to twelve wipers of a stepping switch indicated generally at 42. These twelve wipers move as a unit; however, each of these wipers is electrically independent of the others and engages one of the twelve contacts of the switch at all times. A motor magnet 43, operated once an hour by the clock mechanism 10 over the obvious circuit, advances all of the wipers one step in a clockwise direction, as indicated by the arrow, at the end of each hour.

Connected to the bank contacts are twelve electromagnetic stop devices, of which the first is shown at 44 and the last at 45. As shown in the drawing, contactor 38 is connected to the switch wiper which engages the bank contact to which the magnet of stop 44 is connected. Stop 44 indicates that zero or 12 whole hours have elapsed since in the twelve-hour maximum system shown, zero and twelve hours coincide.

The switch 42 functions to translate the start hour recorded by the hour perforation in the card into whole hours elapsed between the hours of start and finish. The switch is shown in the position it assumes at one o'clock. When magnet 43 operates the switch at two o'clock, the wiper shown connected to the contact to which the magnet of stop 44 is connected moves to the next contact to designate an elapsed time of one hour. At the same time, the wiper connected to the contactor that registers with the number 2 space on the card moves into engagement with the contact leading to the magnet of stop 44. With this arrangement, at any hour of the day, the contactor engaging the space on the card corresponding with that hour will always be connected to a wiper that is engaging the contact to which the magnet of stop 44 is connected, designating zero elapsed hours, and the other contactors will be connected to wipers engaging contacts leading to stops corresponding to hours elapsed between start and finish times.

When magnet 31 was energized as above, and contactor 38 moved through the perforation in the card, a circuit was closed from positive through spring 30 and its make contact, plate 40 engaged by the contactor 38, slip ring 41, the first wiper of switch 42, through the winding of the magnet of stop 44 to negative, operating that magnet.

Insulating bar 36 carries a second group of contactors which are twenty in number, of which the first, 50, and the last, 51, are shown. The contactors in this group register with the spaces in group 4 on the time card. Assuming that contactor 50 registers with the 00 space, which is now perforated, a circuit will be extended from plate 40 through contactor 50, slip ring 52, through the winding of electromagnetic stop device 53, which is the first of a second group of such stops, which second group contains twenty magnets, the first and last of which are shown at 53 and 54, respectively. Magnet 53 operates over this circuit.

Included in the computer mechanism is another stepping switch, indicated generally at 55, and containing a wiper 56 that engages one of the twenty contacts in its bank, the magnet 55A of this switch being operated once every three minutes over the obvious circuit from the clock 10 to advance the wipers step-by-step. Each of the twenty contacts of switch 55 is connected through suitable slip rings 57 to an electromagnetic stop device in a third group of twenty, of which the first, 58, and the last, 59, are shown.

Relay 26, upon operating as above, closes spring 60 against its make contact, thereby closing a circuit from positive through that spring and contact, through slip ring 61, wiper 56 shown to be resting on the 00 contact and extending the circuit through slip ring 57, and the winding of the magnet of stop 58 to negative, operating that magnet.

Figures 2, 3:
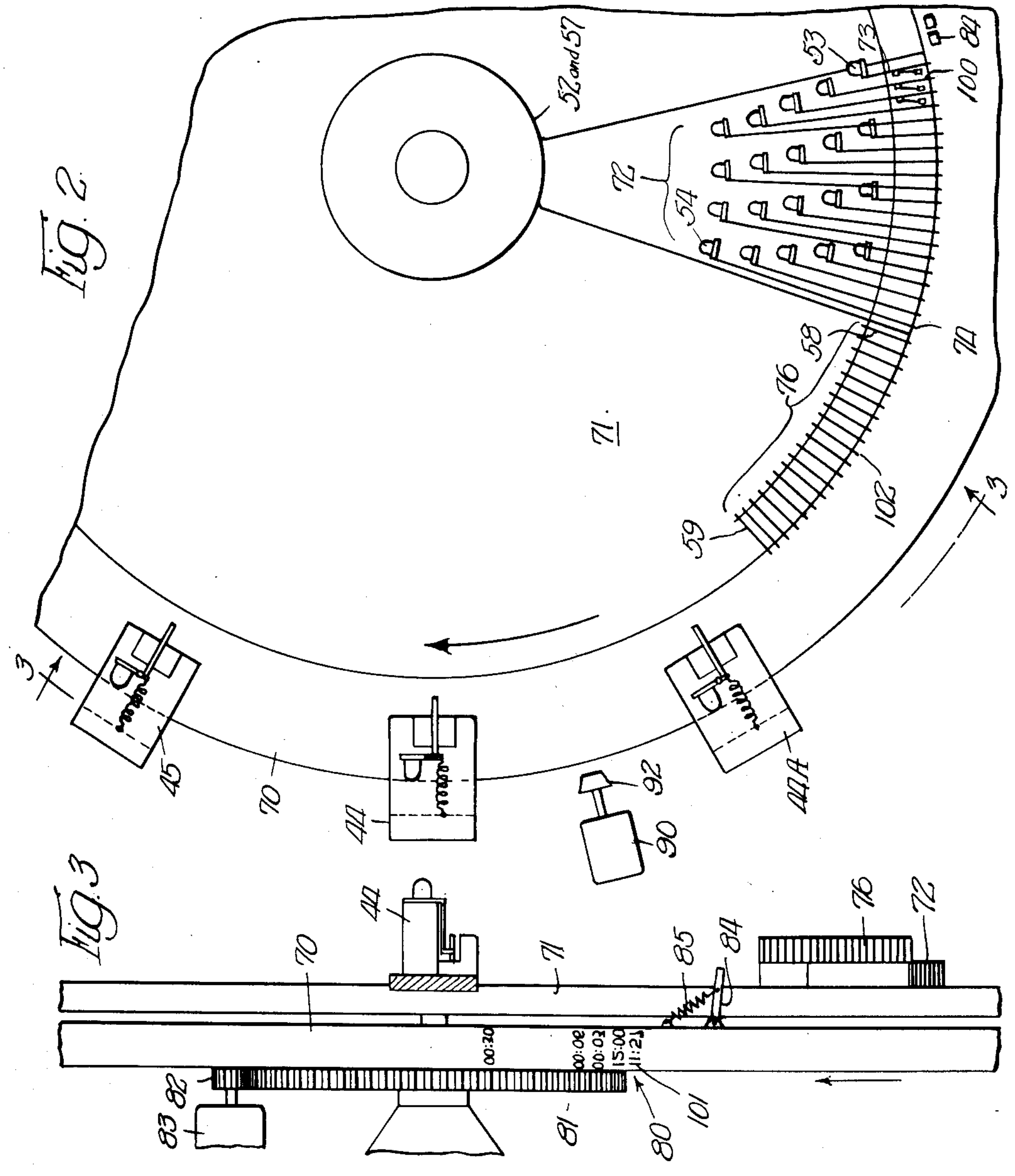
Fig. 2 is a diagrammatic plan view of apparatus for carrying out the method.
Fig. 3 is an elevational view taken substantially along the line 3—3 of Fig. 3, looking in the direction of the arrows.

The first group of electromagnetic stops, of which the first and last are shown at 44 and 45, are mounted stationarily at 30° intervals near the periphery of a movable printing disc 70, as shown in Fig. 2. Also shown in Fig. 2 is a third electromagnetic stop device 44A, which is another one of this group and is shown the better to illustrate the relative positions of the stops in the group.

Mounted above the printing disc 70 and free to rotate with respect thereto around the axis of rotation thereof, is a control disc 71 upon which are mounted two groups of stop devices, a first level group 72 containing the twenty devices of which 53 and 54 are a part. Mounted adjacent the outer periphery of the disc are the individual stops, such as 73, operated by magnet 53, and 74 operated by the magnet 54. The twenty stops in this group span an arc of 28½° on the control disc 71 being spaced 1½° apart. When the magnets are deenergized, the stops are retracted into substantial coincidence with the periphery of the disc. When the magnet is energized, the stop is projected beyond the periphery of the disc.

Also mounted upon the control disc 71 and at a level spaced from the group 72 and the disc 71 another group 76 of twenty stops, comprising the above mentioned third group of which the first stop 58 and the last stop 59 are shown. In Figs. 2 and 3, the magnets for operating these stops have been omitted to avoid an unnecessary complication of the drawings.

With the switches in the position shown in Fig. 1 and circuits closed to the magnets operating stops 44, 53 and 58 as above explained, stationary stop 44, which is located in the same level as the stops in group 76 will be moved to operative position, stop 58 will project beyond the periphery of the control disc to engage stop 44, and stop 73 will project beyond the control disc in a plane between stop 44 and the disc 71.

With start time shown recorded as one o'clock, and finish time shown as one o'clock, a full 12-hour time interval has elapsed.

Carried upon the printing disc and around the periphery thereof are type figures 80, of which a few are shown. Those figures start with 12:00 and progress clockwise around the printing disc 70 in 3-minute steps. Connected to the printing disc is a gear 81 that is engaged by a pinion 82 on a motor 83. Also carried on the printing disc is a lever 84 which is tensioned by a spring 85 that is adjustable, as indicated at 86, Fig. 1.

Operation of relay 26 as above, closes spring 87 against its make contact, thereby closing the obvious circuit for relay 88 which operates to connect the motor 83 across the line, causing it to operate and rotate the printing disc in clockwise direction, as indicated by the arrow, thereby to move lever 84 into engagement with the stop 73 which is projecting beyond the periphery of the control disc. Further movement of the printing disc 70 causes the control disc 71 to move also in a clockwise direction, this movement continuing until the operated stop (58 in the example under discussion) engages the operated stationary stop (44 in this example). When stop 58 engages stop 44, control disc 71 is brought to rest. Power still being on the motor, the printing disc 70 continues to advance, the power of the motor overcoming the tension of spring 85 thereby moving lever 84 into engagement with its make contact 89, closing the circuit from positive through spring 87 and its make contact, through the winding of printing magnets 90 and 91 to negative, operating those magnets. The movement of the printing disc and control disc, as above, brings type face 12:00 into registration with printing position, and printing magnet 90 upon energization operates to bring platen 92 against the card and to force that card into printing engagement with the type face. Simultaneously printing magnet 91 strikes the card into engagement with a finish time recorder 93, thereby to print upon the card 1 numerals indicating the elapsed time, as shown at 94, and the finish time as shown at 95.

Operation of print magnet 90 opens spring 27 away from its break contact thereby opening the previously traced holding circuit through spring 29 and the relay 26, permitting relay 26 to restore, thereby opening previously traced circuits to bring the equipment to rest. Relay 26, upon energizing, closes spring 96 against its make contact, thereby completing the circuit for relay 97 which operates and closes a holding circuit through spring 98 and the make contact of micro-switch 20. Relay 97 opens springs 22 thereby opening a point in the circuit over which relay 26 was initially operated. Restoration of the equipment by the restoration of relay 26, as explained above, is made possible by opening the initial operating circuit of the relay at springs 22. So long as the card 1 remains in the device and micro-switch 20 maintains its contact closed, further operation of the equipment is impossible. As soon as the card is withdrawn, relay 97 restores and the equipment is then in readiness for another operation.

Printing disc 70 and control disc 71 do not have a normal or home position, and when the device is restored to normal these discs remain in the position occupied when printing occurred, or within a few degrees of that position.

Assume for the moment that the start time, instead of being 1:00 as shown, was 1:03, and that the finish time was 1:00 as before. Under such circumstances the elapsed time will not be twelve hours, but rather will be eleven hours and fifty-seven minutes. When contactor 38 is engaged with the card as above, the same circuit will be closed. When contactors 50 and 51 engage the card, a circuit will not be completed to magnet 53, but rather to the second magnet, not shown in Fig. 1, indicating that the start time was three minutes past the hour. Energization of this second magnet moves the stop 100 beyond the periphery of the control disc 71, and as a result printing disc 70 moves 1½° farther before lever 84 engages a stop and before the control disc is moved. The disc 70 and 71 are then moved until stop 58 engages stop 44 as before. The printing disc having moved farther in a clockwise direction, before engaging the control disc, when the two discs are stopped, the control disc 71 will have moved 1½° less than in the previous example and legend 101, which is 11:57, will be aligned in printing position so that printing magnet 90, upon operating, will record 11:57 as the elapsed time upon the time card.

Assume further that an operation starting at 1:00 is finished at 1:30, the magnet of stop 44 will be energized as before, as will magnet 53, since the start time is the same as in the previous example. Since the clock time is now assumed to be 1:30, the magnet of stop 58 will not be energized but rather the magnet controlling stop 102 will be energized to project that stop beyond the periphery of the control disc. The printing disc moves until lever 84 engages stop 73 as before and then both discs move until stop 102 engages stop 44. Since stop 102 moves into engagement with stop 44, while stop 58 is still ten spaces away from stop 44, the particular legend aligned in printing position will be ten spaces from the 12:00 legend, and the legend 00:30 which is ten spaces from legend 12:00 will be brought to rest in printing position to record an elapsed time of thirty minutes under the condition assumed.

From the foregoing it will be seen that from 00, when stops 58 and 73 are operated, each step between the stops in group 72 subtracts three minutes from the whole hours of elapsed time and each step from stop 58 in group 76 adds three minutes thereto. With twelve stationary stops located around the periphery of the control disc and operated to designate whole hours of elapsed time, any elapsed time from 00:03 to 12:00 can be computed and recorded with the apparatus diagrammatically illustrated.

As explained above, the clock mechanism 10 closes a circuit to magnets 16 and 55*a* every three minutes, and to magnets 9 and 43 once every hour. It may frequently happen that these circuits, particularly to magnets 16 and 55*a*, may be closed while the computer is going through its cycle of operation. Obviously if the computer switches were changed during such a cycle, an erroneous recordation would result. To prevent this, magnet 55*a* is provided with a spring 110 which is moved into engagement with its make contact when the magnet energizes. Magnet 43 is equipped with a similar spring 111. When relay 26 is operated, it closes spring 112 against its make contact, thereby completing a circuit from positive through spring 110 and its make contact and the winding of magnet 55*a* to negative, with a parallel branch through spring 111 and its make contact, through magnet 43 to negative. When the pulse from the clock, by which these magnets were initially operated, terminates, the magnets remain operated until relay 26 restores at the end of the cycle of the device, and repositioning of the wipers to indicate the new time is thus delayed until the device has completed its cycle.

It may also happen that a workman may insert a card, such as 1, into the device during the interval when the clock has energized magnet 55*a* preparatory to advancing the switch wiper. Energization of magnet 55*a* opens spring 24 away from its break contact, thereby opening the previously traced circuit for relay 26 delaying the energization of that relay and consequent initiation of a computing-recording cycle until the clock removes the pulse and the switch has been set to the new time position.

From the foregoing it will be apparent that the method of the present invention records permanently on a time card the time of start, the time of finish, and the elapsed time, the latter two recordations being made as a part of the punch-out operation so that when the workman removes the card from the device he can see immediately exactly how much time he consumed. The mechanism required to compute and record the elapsed time diagrammatically illustrated herein can be manufactured at low cost, and because of its simplicity can be maintained in proper operating condition much more economically than the more complicated computing devices of the prior art of which I am aware. Since neither the printing disc 70, nor the control disc 71, has a home position to which it returns at the end of each cycle, it will frequently happen that the discs move only a few degrees during a cycle. This fact contributes materially to the lowering of maintenance cost on the apparatus.

While a specific circuit arrangement and apparatus are diagrammatically shown to illustrate the invention, the method herein taught can be performed by other means, and that which is shown has been shown by way of example only.

Having thus complied with the statutes and shown and described a preferred embodiment of my invention, what I consider new and desire to have protected by Letters Patent is pointed out in the appended claims.

What is claimed is:

1. Apparatus for automatically computing the hours and fractional hours elapsed between start and punchout times and for recording said elapsed time in Arabic figures on a card on which the start time data has been previously recorded by means including a pair of perforations representing hours and fractional hours, respectively, comprising: means including type bars on a rotatable disk for printing hours and fractional hours in Arabic figures; clock controlled means for continuously registering hours and fractional hours in said apparatus; means for sensing the coded in time of the card means including a second disk controlled through said sensing means, the hour perforation in the card and the hour registering means for setting the means for printing hours in accordance with the whole hours elapsed between said start and punchout times; means including said second disk controlled through said sensing means the fractional hour perforation in the card and the means for registering fractional hours for setting the means for printing fractional hours in accordance with the fractional hours elapsed between said start and punchout times; and means for striking the card to print thereon said elapsed time.

2. Apparatus for automatically computing the hours and fractional hours elapsed between a start time and a punch-out time and for recording said elapsed time in Arabic figures on a card on which the start time has been previously recorded, which card contains a pair of perforations representing hours and fractional hours of start time respectively, comprising: means including type bars on a rotatable disk for printing hours and fractional hours in Arabic figures; means including a pair of stepping switches for continuously registering hours and fractional hours respectively in said apparatus; means for sensing the coded in time of the card means controlled through said sensing means, the perforations in said card and through said registering means for rotating said disk to set said type bars to print the hours and fractional hours elapsed between the start time recorded on the card and the time at punch-out; and means for striking said card to print said elapsed time thereon.

3. Apparatus as claimed in claim 2, in which the stepping switch on which hours are registered is stepped once an hour and the switch on which fractional hours are registered is stepped once with the passing of said fraction of an hour and in which the stepping of said switches is delayed by electrical means until the end of a computing-recording cycle then in progress.

LOIS K. STRAUS.

References Cited in the file of this patent

UNITED STATES PATENTS

| Number | Name | Date |
|---|---|---|
| 1,260,705 | Pierce | Mar. 26, 1918 |
| 1,267,510 | Bryce | May 28, 1918 |
| 1,432,627 | Shenstone | Oct. 17, 1922 |
| 1,582,333 | Bryce | Apr. 27, 1926 |
| 2,312,137 | Watson | Feb. 23, 1943 |
| 2,591,448 | Lorenz | Apr. 1, 1952 |